US006269409B1

(12) United States Patent
Solomon

(10) Patent No.: US 6,269,409 B1
(45) Date of Patent: Jul. 31, 2001

(54) METHOD AND APPARATUS FOR CONCURRENT EXECUTION OF OPERATING SYSTEMS

(75) Inventor: Richard L. Solomon, Colorado Springs, CO (US)

(73) Assignee: LSI Logic Corporation, Milpitas, CA (US)

( * ) Notice: Subject to any disclaimer, the term of this patent is extended or adjusted under 35 U.S.C. 154(b) by 0 days.

(21) Appl. No.: 08/923,880

(22) Filed: Sep. 2, 1997

(51) Int. Cl.$^7$ .......................................... G06F 9/00
(52) U.S. Cl. ......................... 709/329; 709/318; 709/319
(58) Field of Search ................... 395/733, 736, 395/500, 860, 670, 678; 709/100, 101, 102, 108, 313, 314, 318, 319, 329

(56) References Cited

U.S. PATENT DOCUMENTS

| | | | |
|---|---|---|---|
| 4,747,040 | 5/1988 | Blanset et al. | 364/200 |
| 4,764,864 * | 8/1988 | Takane | 395/736 |
| 4,975,836 | 12/1990 | Hirosawa et al. | 364/200 |
| 5,278,973 * | 1/1994 | O'Brien et al. | 395/500 |
| 5,371,857 * | 12/1994 | Takagi | 395/733 |
| 5,408,617 | 4/1995 | Yoshida | 395/325 |
| 5,410,709 | 4/1995 | Yu | 395/725 |
| 5,414,851 | 5/1995 | Brice, Jr. et al. | 395/650 |
| 5,499,379 | 3/1996 | Tanka et al. | 395/700 |
| 5,526,523 | 6/1996 | Straub et al. | 395/700 |
| 5,600,805 | 2/1997 | Fredericks et al. | 395/825 |
| 5,613,090 | 3/1997 | Willems | 395/500 |

OTHER PUBLICATIONS

Bollela et al. "Supporting Co–Resident Operating Systems" pp. 4–14, IEEE, 1995.*
Software Patent Institute Database of Software Technologies; How SoftPC Works; Jan., 1993; pp. 1–6.

* cited by examiner

*Primary Examiner*—Majid A. Banankhah

(57) ABSTRACT

The present invention provides an improved method and apparatus for concurrent execution of operating systems. A software abstraction layer provides an interface that allows a first operating system to run concurrently with a second operating system on the same data processing system, in which the first operating system is in communication with the base machine in the data processing system. Interaction between the second operating system and the base machine is handled by the software abstraction layer translating requests and calls from a format normally made by the second operating system to the base machine into a format that is processed by the first operating system. Request and data intended for the second operating system are received by the first operating system, sent to the software abstraction layer and translated by the software abstraction layer into a format usable by the first operating system.

26 Claims, 11 Drawing Sheets

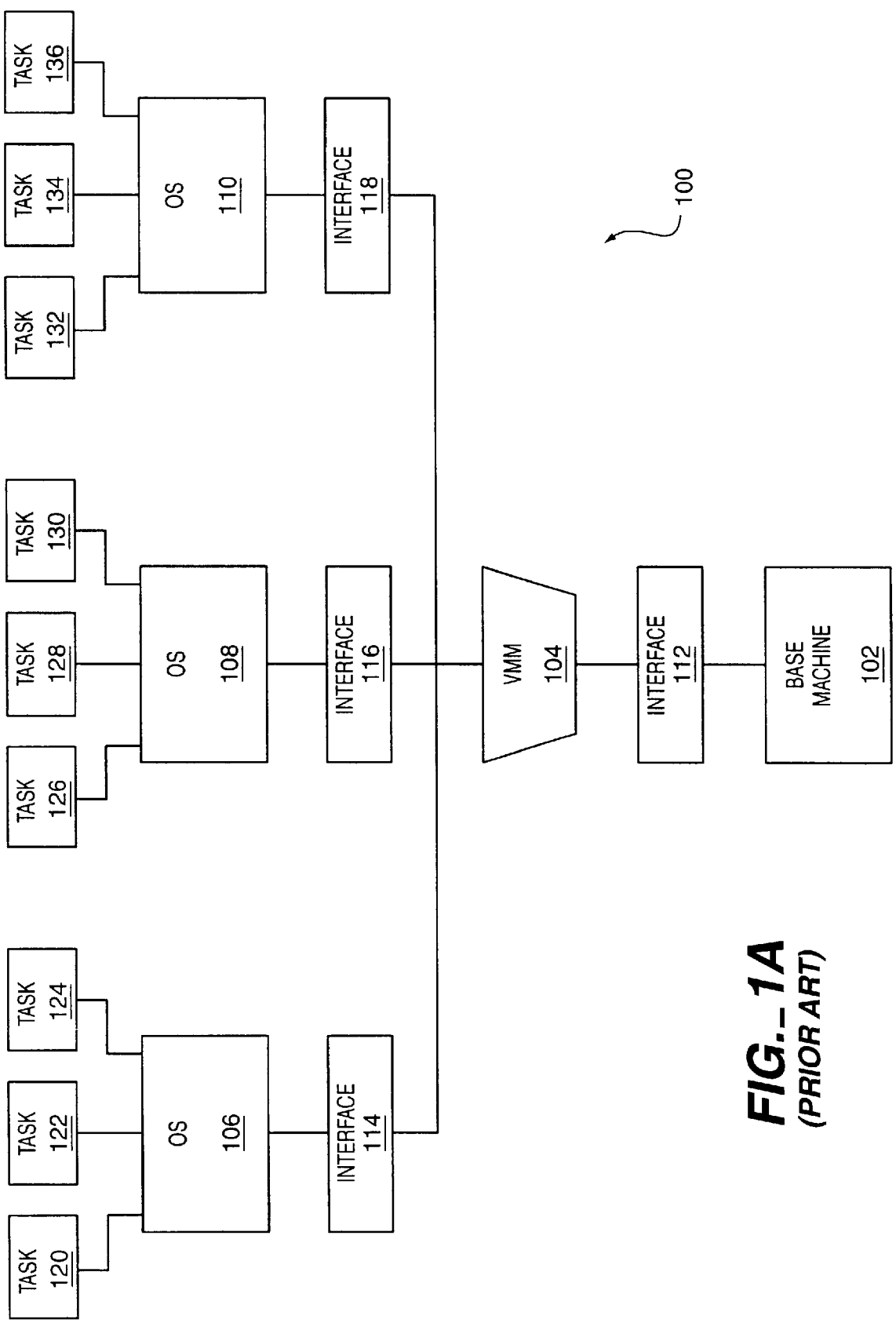
FIG._1A
(PRIOR ART)

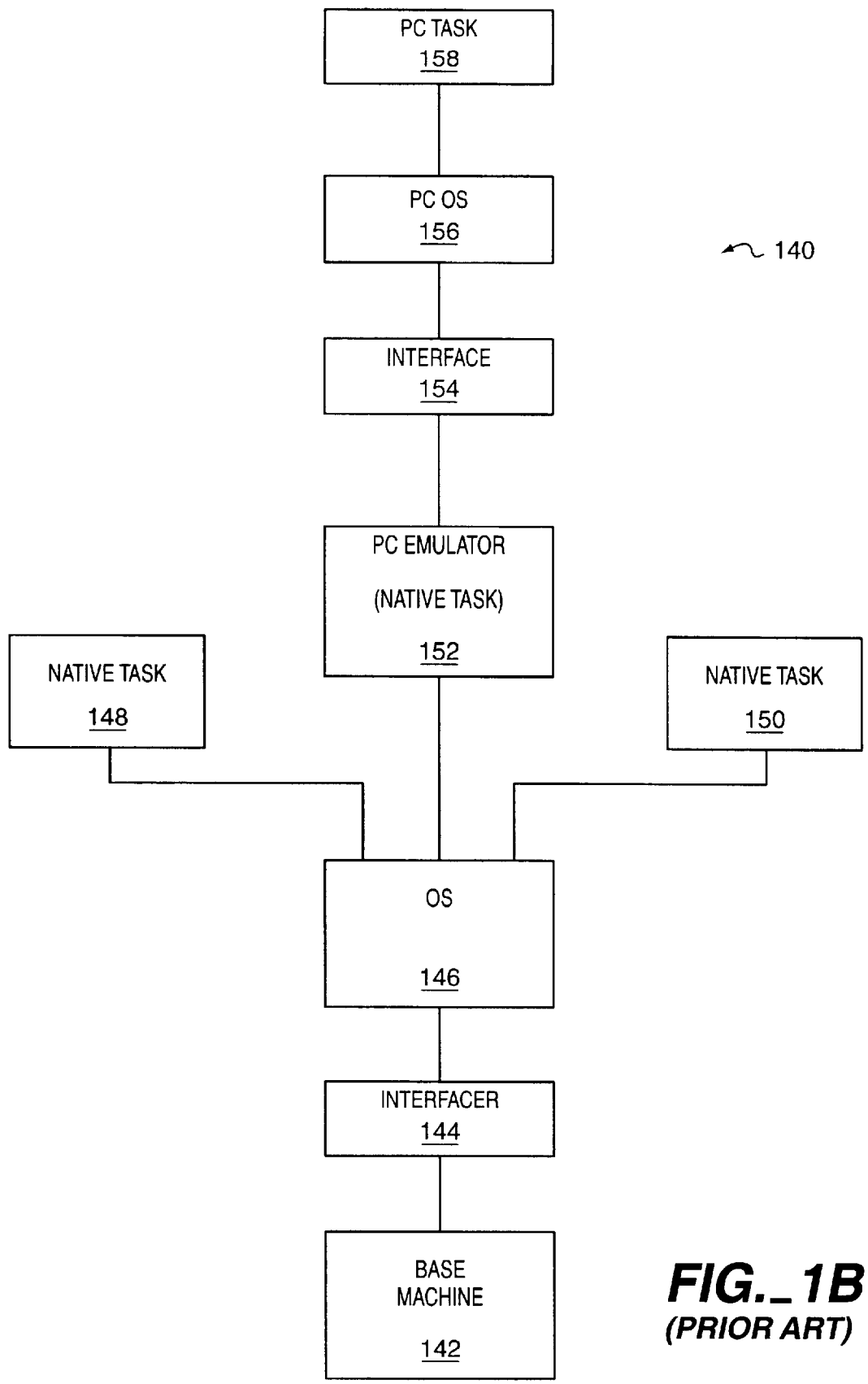
FIG._1B
(PRIOR ART)

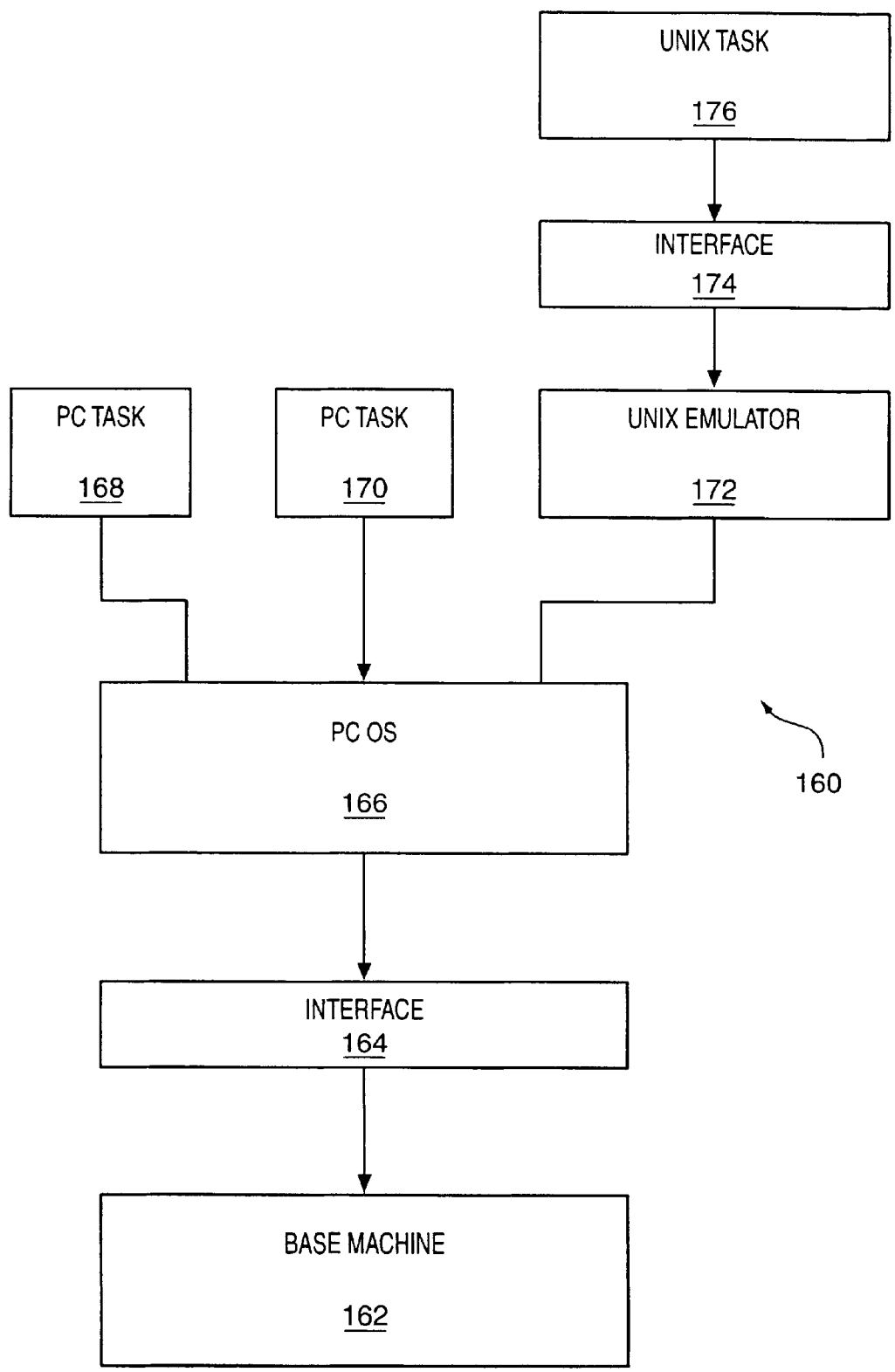
FIG._1C
*(PRIOR ART)*

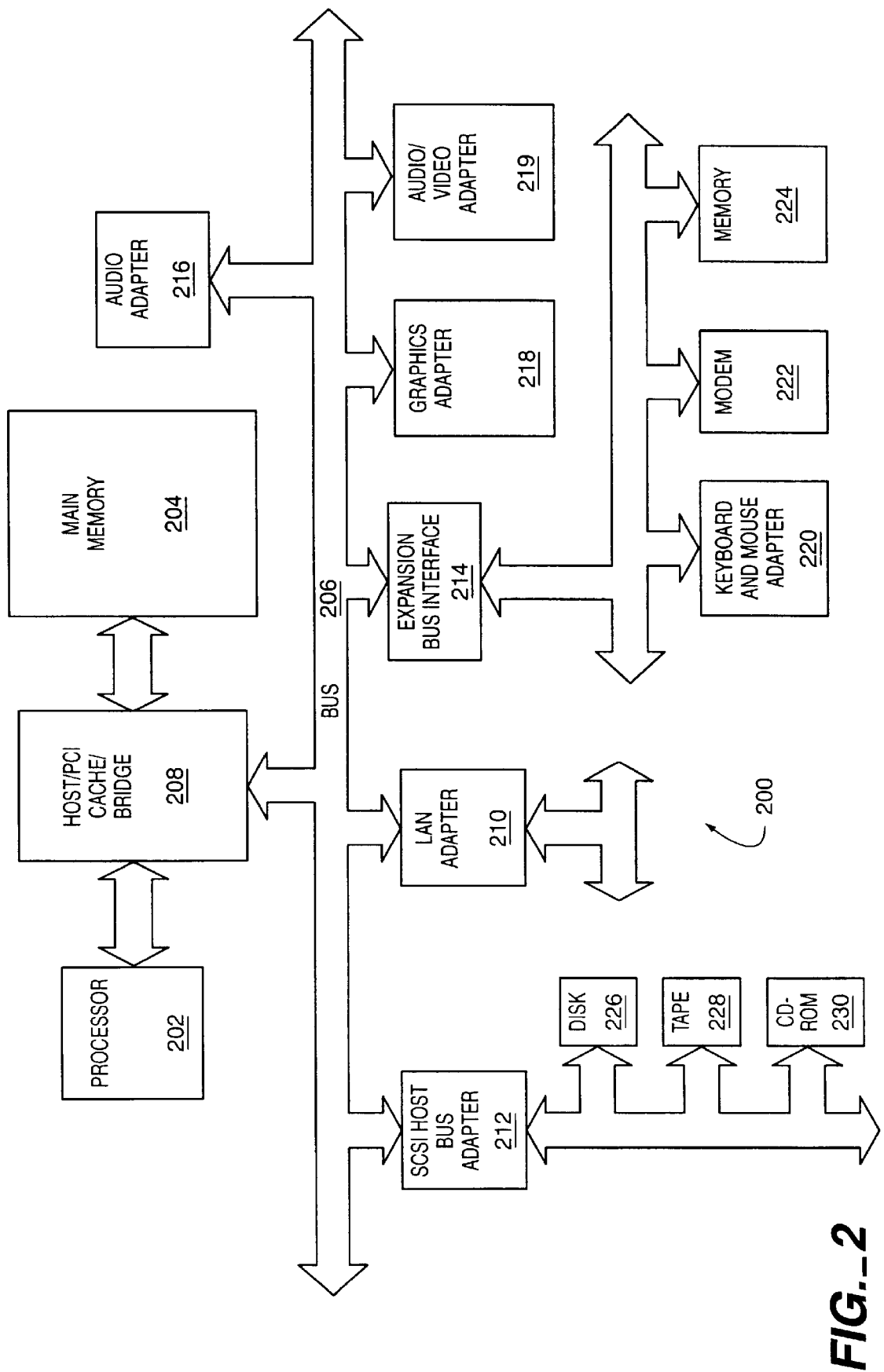
FIG._2

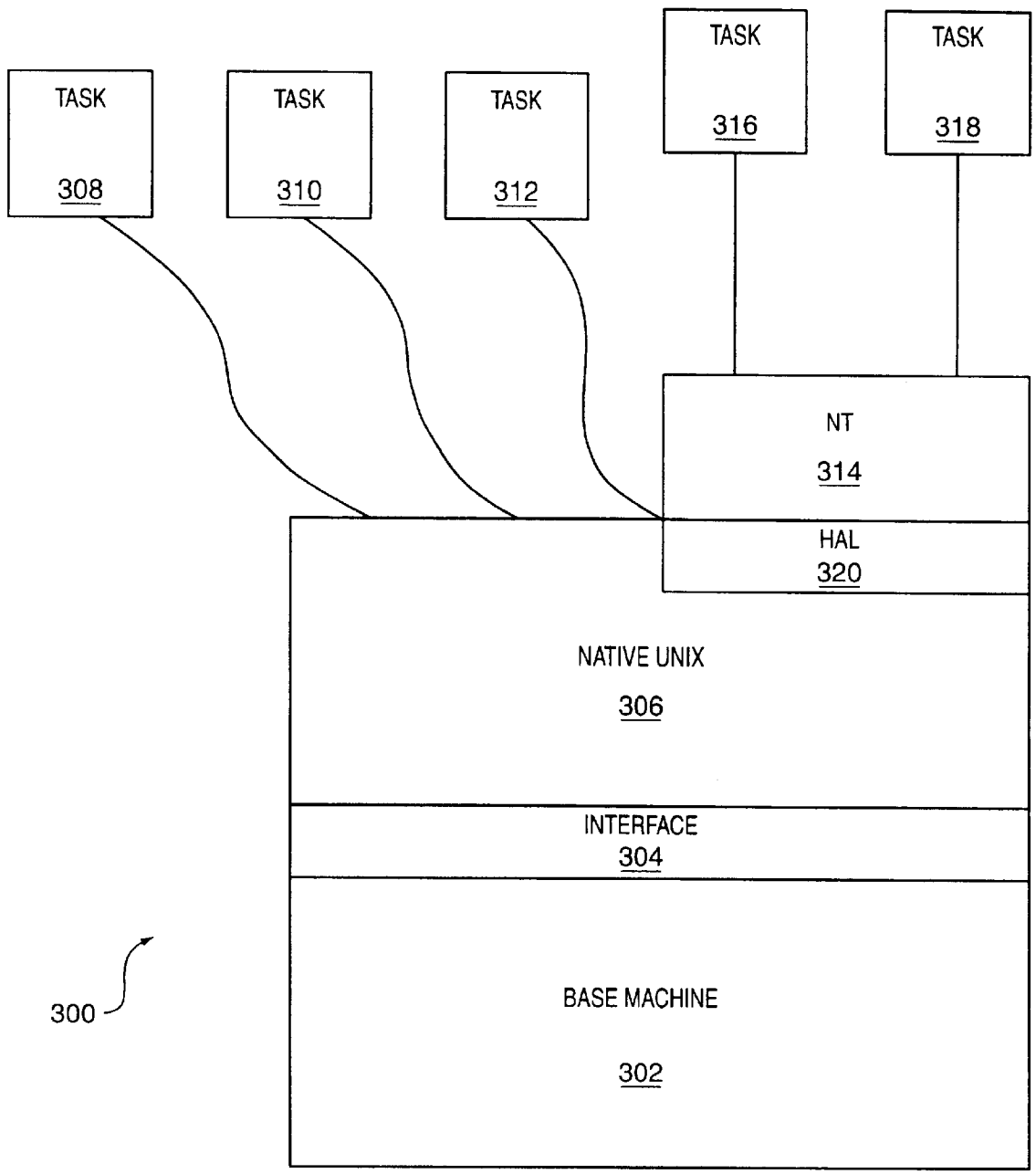
FIG._3

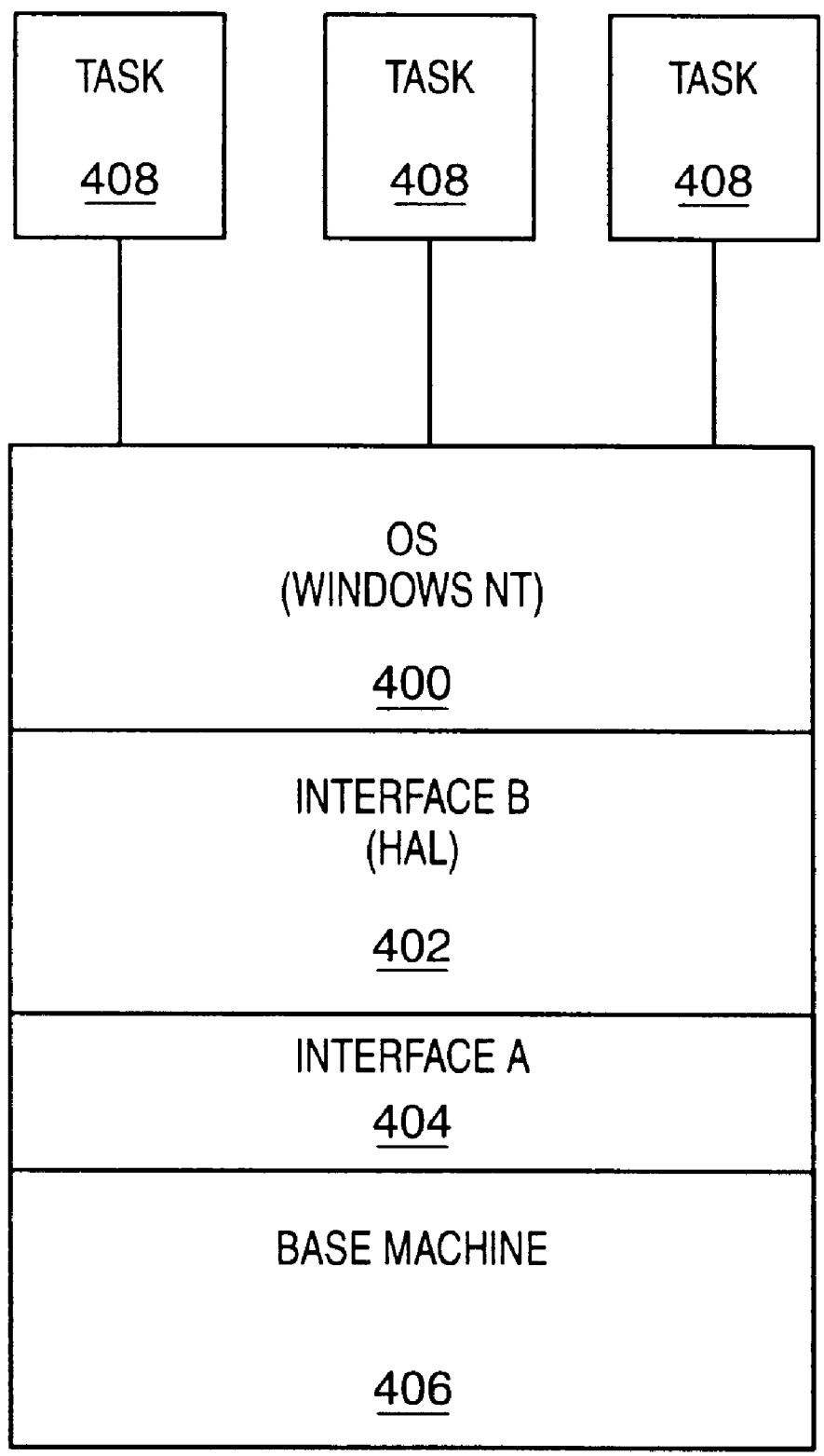
FIG._4

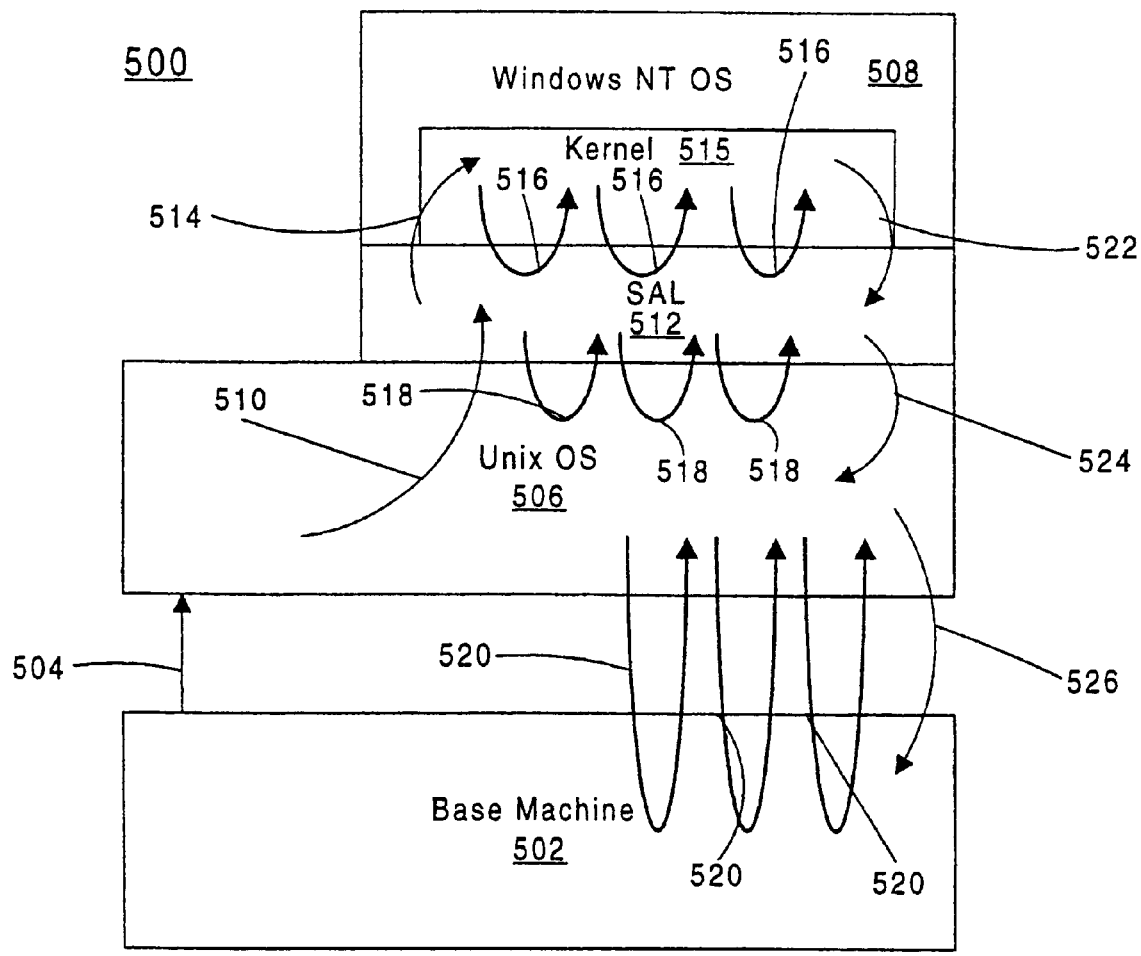
FIG._5

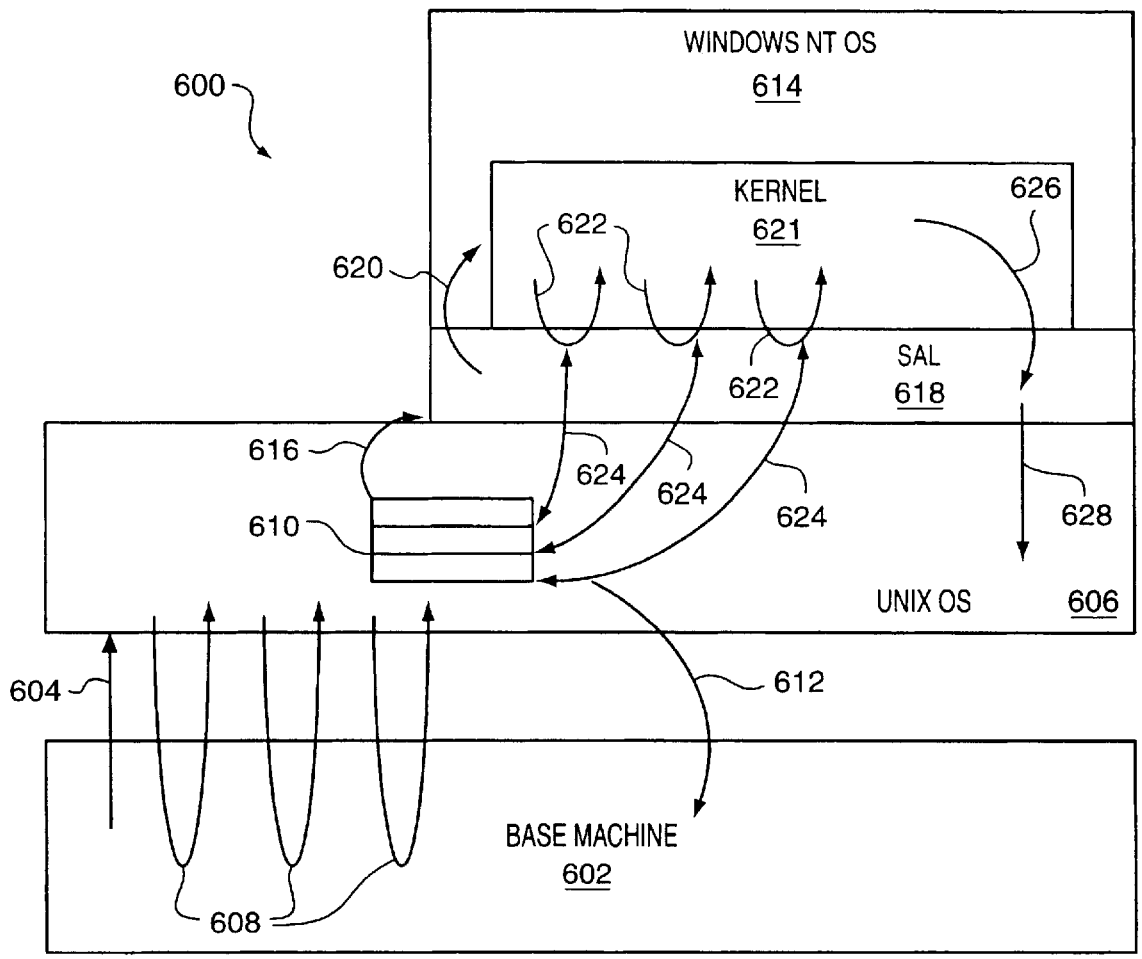
FIG._6

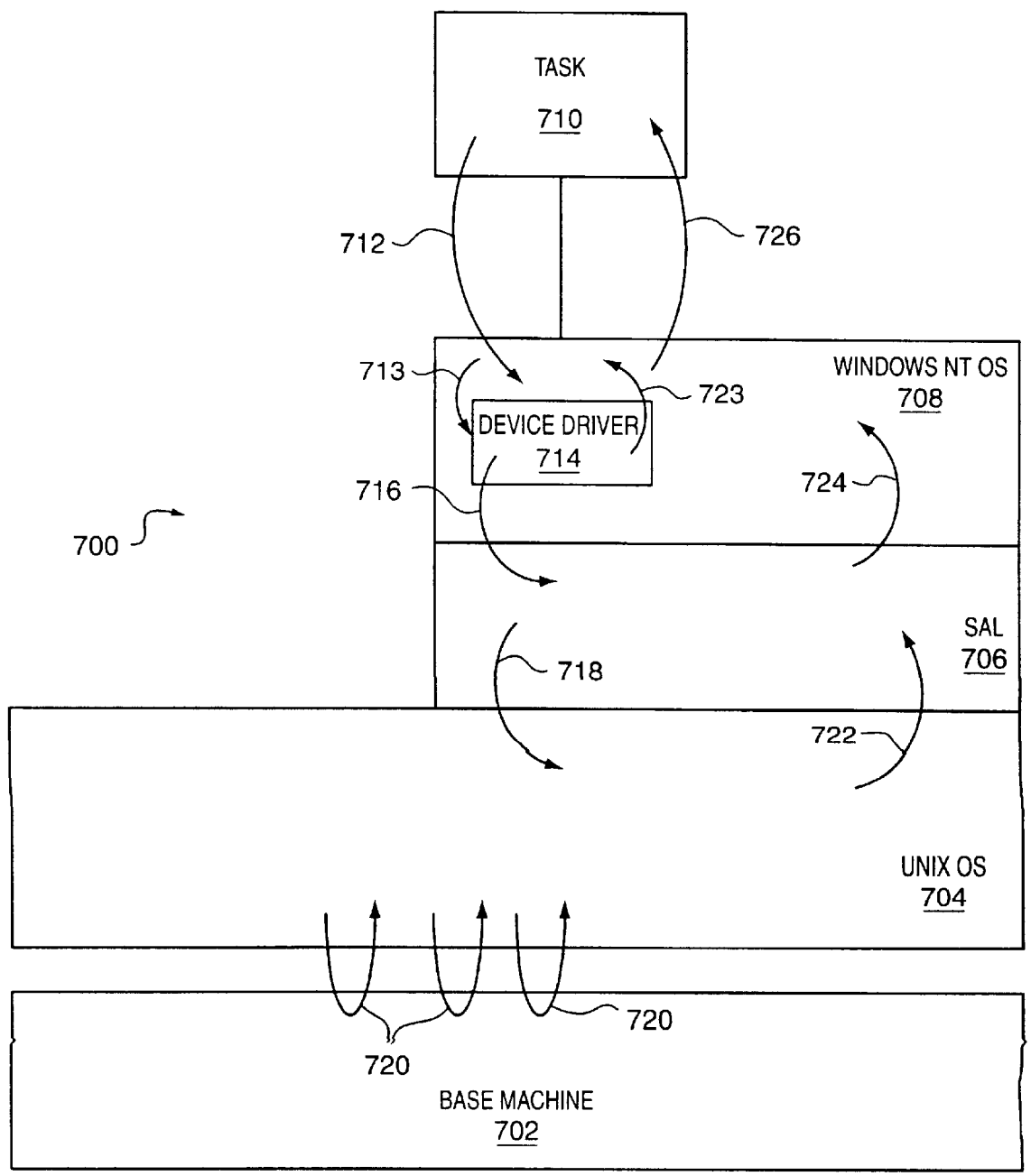
FIG._7

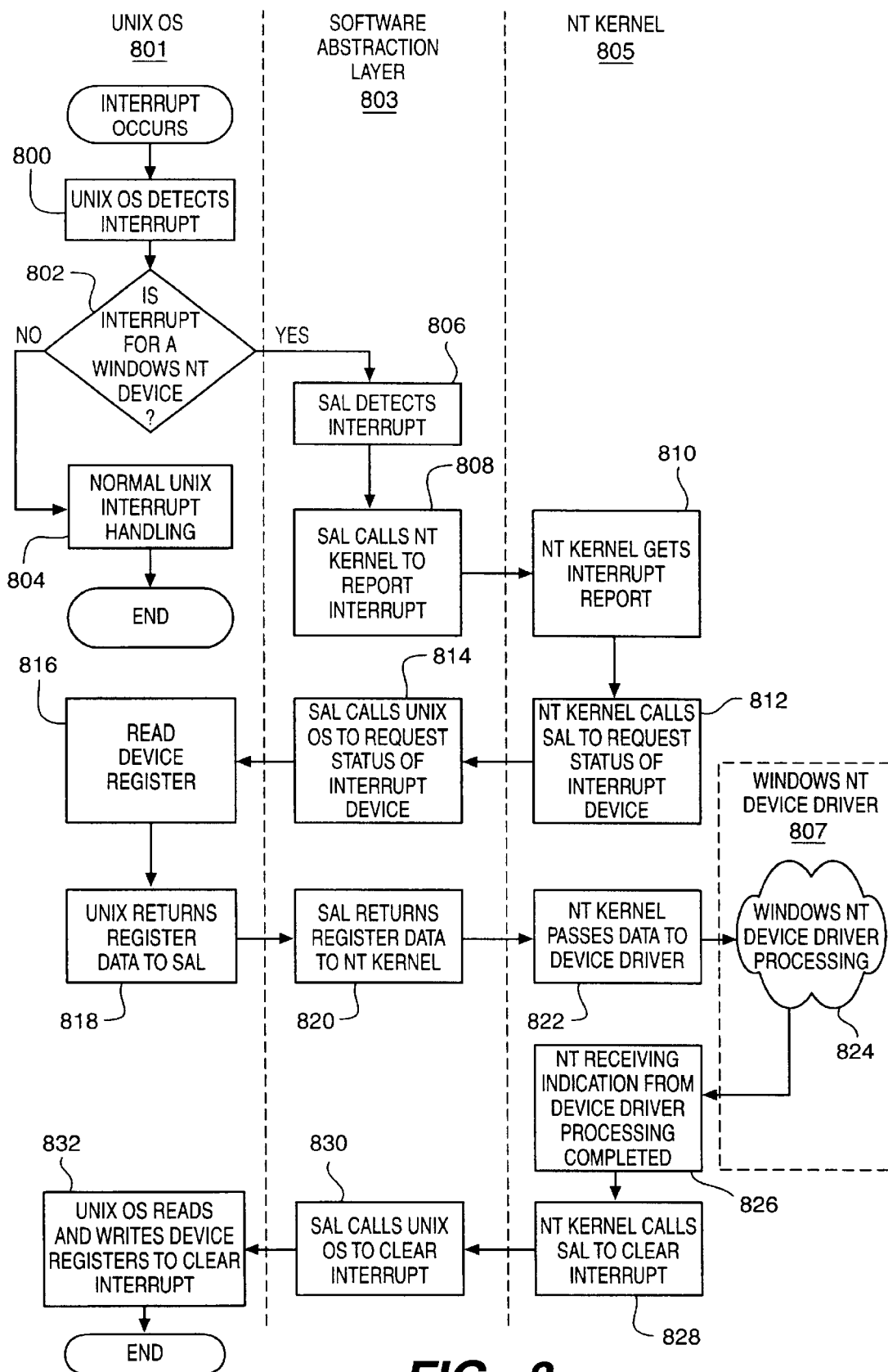
FIG._8

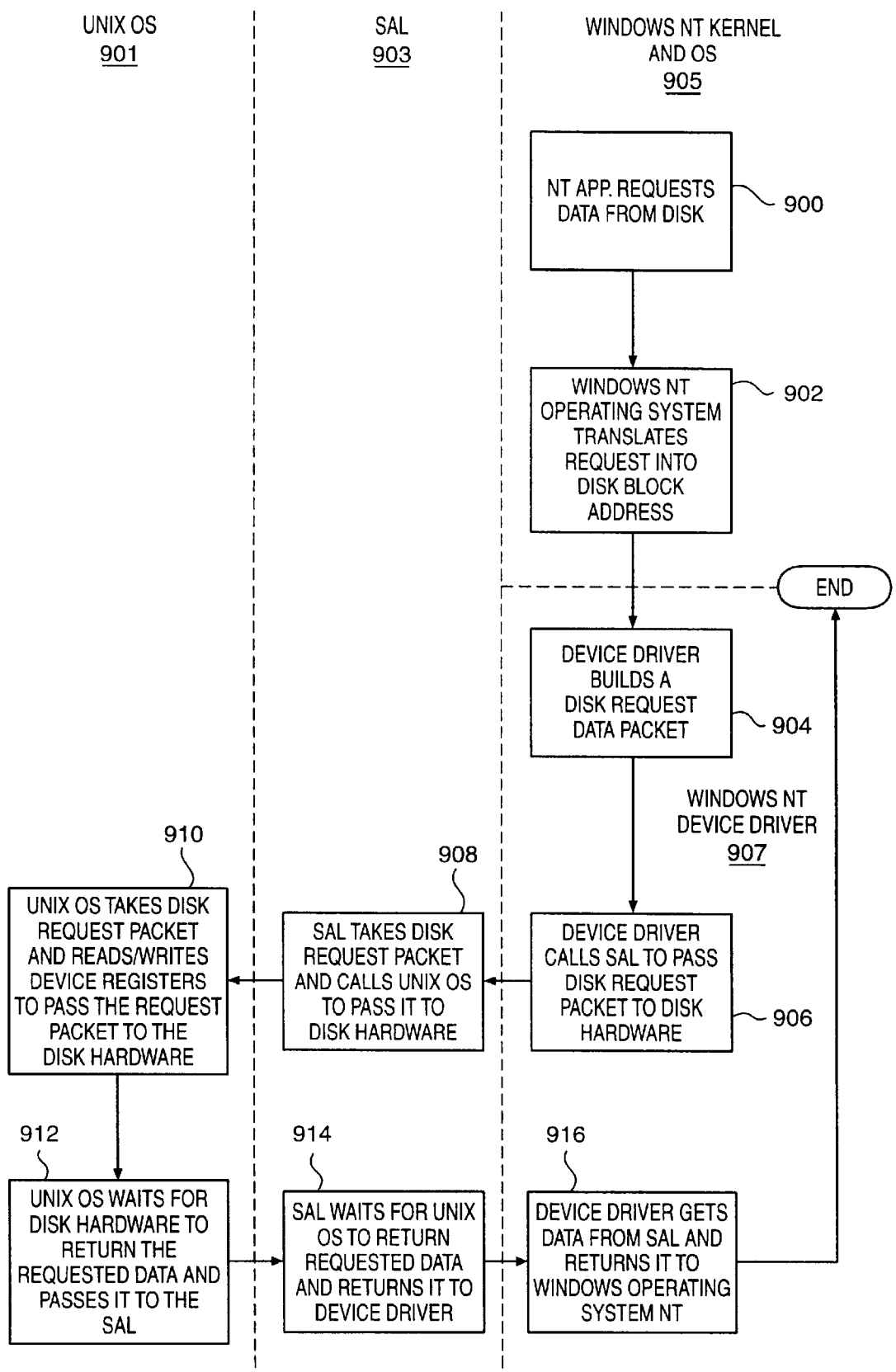
FIG._9

METHOD AND APPARATUS FOR CONCURRENT EXECUTION OF OPERATING SYSTEMS

BACKGROUND OF THE INVENTION

1. Technical Field

The present invention relates generally to an improved data processing system and in particular to execution of operating systems in a data processing system. Still more particularly, the present invention relates to a method and apparatus for concurrent execution of operating systems within a data processing system.

2. Description of the Related Art

Virtual machine system (VMS) 100 is one architecture that makes it possible to apparently run simultaneously a number of operating systems (OS) on base machine (BM) 102, as illustrated in FIG. 1. A specific control program, such as virtual machine monitor (VMM) 104 is employed to interface between operating systems 106, 108, and 110 in FIG. 1. Instead of directly employing a base machine interface between base machine 102 and operating systems 106, 108, and 110, interface 112 is the interface between virtual machine monitor 104 and base machine 102. Interfaces 114, 116, and 118, also referred to as virtual machines, provide interfaces between operating systems 106, 108, and 110 and virtual machine monitor 104. Virtual machine monitor 104 provides interfaces 114, 116, and 118 to allow operating systems 106, 108, and 110 to appear to operate simultaneously. In reality, virtual machine monitor 104 provides a multiplexer function to correctly direct data flow between base machine 102 and operating systems 106, 108, and 110. In FIG. 1, three operating systems are illustrated, but any arbitrary number of operating systems may be employed.

Operating systems 106, 108, and 110 each execute a number of tasks. In the depicted example, operating system 106 executes tasks 120, 122, and 124 while operating system 108 executes tasks 126, 128, and 130. Operating system 110 executes tasks 132, 134, and 136. In this manner, virtual machine system 100 allows a number of operating systems to appear to execute simultaneously on a single base machine. Virtual machine system 100 requires all computer software to be written to the same base machine interface.

In FIG. 1B, a known system for executing personal computer applications on another operating system is illustrated. Data processing system 140 includes a base machine 142, which is connected to an interface 144. Operating system 146 communicates with base machine 142 through interface 144. Native task 148 and 150 are executing an operating system 146. Additionally, personal computer (PC) emulator 152 also is executing within operating system 146 as a native task. PC emulator 152 emulate the central processing unit (CPU) and peripherals of a personal computer. In addition, interface 154 is provided to aid in emulating the entire PC to allow PC operating system 156 to run. In this manner, PC task 158 may be executed within data processing system 140 even though data processing system 140 is configured to normally execute data processing system 146.

Turning now to FIG. 1C, a block diagram of a known system for executing UNIX applications along with PC applications is illustrated. Data processing system 160 contains a base machine with an interface 164 to PC operating system 166, which has PC task 168 and 170 executing within it. Additionally, UNIX emulator 172 is executing within operating system 166. Interface 174 is provided to execute UNIX task 176 within data processing system 160. Such a system allows for UNIX applications to execute along with PC applications on a PC compatible data processing system.

This and other types of architectures employed to allow for execution for multiple operating systems depend on the emulation of one environment or the other. Such emulations can lead to significant performance losses and incapabilities. Therefore, it would be advantageous to have an improved method and apparatus for concurrently executing multiple operating systems.

SUMMARY OF THE INVENTION

The present invention provides an improved method and apparatus for concurrent execution of operating systems. A software abstraction layer provides an interface that allows a first operating system to run concurrently with a second operating system on the same data processing system, in which the first operating system is in communication with the base machine in the data processing system. Interaction between the second operating system and the base machine is handled by the software abstraction layer translating requests and calls from a format normally made by the second operating system to the base machine into a format that is processed by the first operating system. Request and data intended for the second operating system are received by the first operating system, sent to the software abstraction layer and translated by the software abstraction layer into a format usable by the first operating system.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

FIG. 1A is a block diagram of a virtual machine system known in the prior art;

FIG. 1B is a known system for executing personal computer applications on another operating system is illustrated;

FIG. 1C is a block diagram of a known system for executing UNIX applications along with PC applications is illustrated;

FIG. 2 is a block diagram of a data processing system in the present invention may be implemented;

FIG. 3 is a block diagram of an architecture for concurrent execution of multiple operating systems in accordance with a preferred embodiment of the present invention;

FIG. 4 is a block diagram of Windows NT operating system having an interface in the form of a hardware abstraction layer that interfaces with interface to base machine;

FIG. 5 is a block diagram illustrating data flow during interrupt handling in accordance with a preferred embodiment of the present invention;

FIG. 6 is a diagram illustrating data flow in processing interrupts in a complex system in accordance with the preferred embodiment of the present invention;

FIG. 7 is a block diagram illustrating data flow in processing input/output requests in accordance with a preferred embodiment of the present invention;

FIG. 8 is a flowchart of a process for interrupt handling in accordance with the preferred embodiment of the present invention; and FIG. 9 is a flowchart of a process for handling input/output requests in accordance with a preferred embodiment of the present invention.

DETAILED DESCRIPTION OF THE PREFERRED EMBODIMENT

With reference now to the figures, and in particular with reference to FIG. 2, a block diagram of a data processing system 200 in which the present invention may be implemented is illustrated. The hardware in data processing system 200 is an example of a base machine in which the present invention may be implemented. Data processing system 200 employs a peripheral component interconnect (PCI) local bus architecture. Although the depicted example employs a PCI bus, other bus architectures such as Micro Channel and ISA may be used. Processor 202 and main memory 204 are connected to PCI local bus 206 through PCI bridge 208. PCI bridge 208 also may include an integrated memory controller and cache memory for processor 202. Additional connections to PCI local bus 206 may be made through direct component interconnection or through add-in boards. In the depicted example, local area network (LAN) adapter 210, SCSI host bus adapter 212, and expansion bus interface 214 are connected to PCI local bus 206 by direct component connection. In contrast, audio adapter 216, graphics adapter 218, and audio/video adapter (A/V) 219 are connected to PCI local bus 206 by add-in boards inserted into expansion slots. Expansion bus interface 214 provides a connection for a keyboard and mouse adapter 220, modem 222, and additional memory 224. SCSI host bus adapter 212 provides a connection for hard disk drive 226, tape drive 228, and CD-ROM 230 in the depicted example.

Typical PCI local bus implementations will support three or four PCI expansion slots or add-in connectors. The depicted example includes four loads on the mother board and three expansion slots. Those of ordinary skill in the art will appreciate that the hardware in FIG. 2 may vary. For example, other peripheral devices, such as optical disk drives and the like may be used in addition to or in place of the hardware depicted in FIG. 2. The depicted example is not meant to imply architectural limitations with respect to the present invention.

Turning now to FIG. 3, a block diagram of an architecture for concurrent execution of multiple operating systems in a data processing system is depicted in accordance with a preferred embodiment of the present invention. Data processing system 300 includes a base machine 302 that has an interface 304 to operating system 306. In the depicted example, operating system 306 is a UNIX operating system. Tasks 308, 310, and 312 are tasks that e designed to operate operating system 306. System 300 also includes an operating system 314 which executes tasks 316 and 318 in the depicted example. Operating system 314 does not have a direct interface to base machine 302. Instead, software abstraction layer (SAL) 320 is employed as interface between operating system 314 and operating system 316. In the depicted example, operating system 314 is a Windows NT operating system available from Microsoft Corporation. In FIG. 3, tasks 316 and 318 are tasks designed to execute within operating system 314. In the depicted example, although only two tasks are illustrated as operating under operating system 314 and three tasks under operating system 306, any arbitrary number of tasks may be executing within these operating systems.

Data processing system 300 does not employ a multiplexer type function found in virtual machine systems. Furthermore, system 300 also does not require emulation of an operating system. As a result, performance losses and incapabilities found with emulations do not occur with data processing system 300. Software abstraction layer 320 provides an interface to execute an operating system, such as operating system 314 as a task under operating system 306, to avoid problems of emulation.

In the depicted example in FIG. 3, no changes are required to Windows NT to implement it as operating system 314 in FIG. 3. Only a DLL file implementing the software abstraction layer itself will need to be used in place of hardware abstraction layer presently found in Windows NT.

More specifically, with respect to FIG. 4, Windows NT operating system 400 has an interface 402 in the form of a hardware abstraction layer that interfaces with interface 404 to base machine 406. These interfaces are used in executing tasks 408, 410, and 412. Interface 402, the hardware abstraction layer, places a layer of code between the operating system and the base machine on which Windows NT is running. This (hardware abstraction layer hides hardware-dependent details such as I/O interfaces, interrupt controllers, and multiple processor communications mechanisms. The hardware abstraction layer is employed to maintain maximum portability for platform dependent information, instead of accessing hardware directly. Platform dependent code, a code relying on a particular manufacturer's implementation of hardware, is placed within the hardware abstraction layer. In accordance with the preferred embodiment of the present invention, the hardware abstraction layer, interface 402 is replaced with a software abstraction layer to allow Windows NT operating system 400 to execute within system 300 in FIG. 3.

Turning now to FIG. 5, a block diagram illustrating data flow during interrupt handling is depicted in accordance with a preferred embodiment of the present invention. Data processing system 500 includes base machine 502. Base machine 502 generates an interrupt 504, which is generated in response to an event occurring within base machine 502. This interrupt is trapped by UNIX operating system 506. UNIX operating system 506 makes a determination as to whether the interrupt is for a device in use by Windows NT operating system 508. In response in determining that the interrupt is for a device within Windows NT operating system 508, UNIX operating system 506 sends call 510 to software abstraction layer 512 to report that an interrupt has occurred. Software abstraction layer 512 then sends call 514 to kernel 515 within Windows NT operating system 508 to report the interrupt for processing. To process the interrupt, kernel 515 within Windows NT operating system 508 makes a number of calls 516 to software abstraction layer 512 requesting data from the underlying hardware back in base machine 502. For example, calls 516 may be for data such as, for example, status, register contents, and other data. For each of the calls 516 received by software abstraction layer 512, this layer makes UNIX operating system calls 518 to address and read one or more registers from actual hardware and base machine 502.

In response to these calls from software abstraction layer 512, UNIX operating system 506 actually makes the necessary requests 520 to address and read the registers in base machine 502. In the depicted example, a "request" is an abstraction of a hardware operation, such as, a register read, or a message passed to hardware controller asking for data from a peripheral on another CPU in a cluster. Once the kernel 515 in Windows NT operating system 508 has completed interrupt processing, it sends call 522 to software abstraction layer 512 to request clearing of the interrupt. In response to this request, software abstraction layer 512 makes the appropriate UNIX operating system calls 524 to access the actual hardware. These calls results in UNIX operating system 506 sending the appropriate request 526 to clear the interrupt in base machine 502.

With reference now to FIG. 6, a diagram illustrating data flow in processing interrupts in a complex system is depicted in accordance with the preferred embodiment of the present invention. In data processing system 600, base machine 602 generates an interrupt 604, which is trapped by UNIX operating system 606. UNIX operating system 606 sends requests 608 to address and read device registers associated with the interrupting device and stores that information in a data structure 610. Next, UNIX operating system 606 sends request 612 to access the hardware within base machine 602 and clear the interrupt. UNIX operating system 606 makes a determination as to whether the interrupts for a device in use by Windows NT operating system 614. If the interrupts are for a device within Windows NT operating system 614, a call 616 is made to software abstraction layer 618 to report that an interrupt has occurred.

In response to receiving this call, software abstraction layer 618 sends a call 620 to kernel 621 within Windows NT operating system 614 for processing. In order to process the interrupt, kernel 621 in Windows NT operating system 614 makes a number of calls 622 to software abstraction layer 618 to request data from base machine 602 for processing the interrupt. These calls 622 may include calls for data, such as, for example, status, register contents, and other data from base machine 602. For each of the calls 622, software abstraction layer 618 sends requests 624 to UNIX operating system 606 to access data structure 610, which was created when UNIX operating system 606 handled the interrupt.

Once kernel 621 within Windows NT operating system 614 has completed interrupt processing, it calls software abstraction layer 618 with a call 626 to clear the interrupt. In response to this call, software abstraction layer 618 sends a notification 628 to UNIX operating system 606 to notify it that the interrupt has been processed by Windows NT operating system 614 and that data structure 610 is now available for deletion or reuse. Similar data flows occur for processing other requests such as input/output requests from a Windows NT operating system.

Turning now to FIG. 7, a block diagram illustrating data flow in processing input/output requests is depicted in accordance with a preferred embodiment of the present invention. Data processing system 700 includes base machine 702, UNIX operating system 704, software abstraction layer (SAL) 706, and Windows NT operating system 708. Task 710 is operating within Windows NT operating system 708. In the depicted example, task 710 is an application that requires data from a disk located within base machine 702. To obtain this data, task 710 sends request 712 to Windows NT operating system 708, which translates this request into a request 713 in a format useable by device driver 714. Device driver 714 is a NT device driver designed to handle requests from Windows NT operating system 708. In response to receiving request 713, the device driver 714 sends a call 716 to software abstraction layer 706 to request a disk block. In response, software abstraction layer 706 translates call 716 into a UNIX input/output (I/O) call 718 and sends call 718 to UNIX operating system 704. After receiving call 718, UNIX operating system 704 sends requests 720 to base machine 702 to actually retrieve data for the disk block. This data is returned to software abstraction layer 706 through data transfer 722. The data in data transfer 722 is in a format for use with UNIX operating system 704. In response to receiving the data in data transfer 722, software abstraction layer 706 transfers the data into a format useable within Windows NT operating system 708. Device driver 714 returns data via transfer 723 to Windows NT operating system 708, which translates the data into a format as requested by task 710. This data is returned to task 710 in data transfer 726 to complete the request made by task 710 for data from a disk. Although the depicted example shows an input/output function in the form of a data transfer from a disk to a task, the processes of the present invention may be applied to other types of input/output functions.

With reference now to FIG. 8, a flowchart of a process for interrupt handling is depicted in accordance with the preferred embodiment of the present invention. The various steps depicted in FIG. 8 occur within UNIX operating system 801, software abstraction layer 803, Windows NT operating system kernel 805, or Windows NT device driver 807. Calls made by the software abstraction layer to kernel 805 in Windows NT operating system are made in a format normally used for Windows NT. As a result, a call originating from UNIX operating system 801 is translated by software abstraction layer 803 in a format for Windows NT operating system kernel 805. The reverse is true for calls from Windows NT operating system kernel 805 to software abstraction layer 803 for accessing the base machine.

The process begins with an interrupt occurring. The UNIX operating system detects the interrupt step (800). Thereafter, a determination is made by the UNIX operating system as to whether the interrupt is for a Windows NT device (step 802). If the interrupt is not for a Windows NT device, the normal UNIX interrupt handling occurs (step 804) with the process terminating thereafter. Otherwise, the interrupt is sent to the software abstraction layer, with the software abstraction layer then detecting the occurrence of the interrupt (step 806). In response to detecting the interrupt, the software abstraction layer calls the kernel in the Windows NT operating system to report the interrupt (step 808). The NT kernel obtains the interrupt report (step 810) and calls the software abstraction layer to request the status of the interrupting device (step 812). In response, the software abstraction layer calls the UNIX operating system to request the status of the interrupting device (step 814). The UNIX operating system reads the device registers (step 816) and returns register data to the software abstraction layer (step 818). In response to receiving the register data, this data is returned to the kernel in the Windows NT operating system (step 820). The kernel passes the data to the device driver associated with the interrupt (step 822). Then, Windows NT device driver processing occurs (step 824) with the kernel receiving an indication from the device driver that the processing has been completed (step 828). In response to receiving this indication, the kernel calls the software abstraction layer to clear the interrupt (step 828), which in turn results in the software abstraction layer calling the UNIX operating system to clear the interrupt (step 830). In response to the call from the software abstraction layer, the UNIX operating system performs the appropriate reads and writes to device registers to clear the interrupt (step 832) with the process terminating thereafter.

In FIG. 9, a flowchart of a process for handling input/output requests are depicted in accordance with a preferred embodiment of the present invention. The steps for the processes illustrated in FIG. 9 occur within UNIX operating system 901, software abstraction layer 903, Windows NT kernel and operating system 905, or within Windows NT device driver 907.

The process begins with a Windows NT application requesting data from a disk (step 900). Next, the Windows NT operating system translates the request into a disk block address (step 902). This request is sent to the device driver, which builds a disk request data packet (step 904). Then the device driver calls the software abstraction layer to pass the disk request packet to the disk hardware in the base machine (step 906). This request packet is sent to the software abstraction layer, which takes the disk request packet and calls the UNIX operating system to pass the request to the disk hardware (step 908). The UNIX operating system take the disk request packet and reads/writes registers to pass the request packet to the disk hardware (step 910). Then, the UNIX operating system waits for the disk hardware to return the requested data and passes the data to the software abstraction layer (step 912). The software abstraction layer waits for the UNIX operating system to return the requested data and returns this data to the device driver (step 914). The device driver obtains the data from the software abstraction layer and returns it to the Windows NT operating system (step 916) with the process terminating thereafter. Although the depicted example shows input/output requests and handling with respect to a disk, the same process may be applied to other input/output devices in the base machine, such as, a network adapter, a modem, or a display device.

Thus, the present invention provides an improved method and apparatus for concurrent execution of operating systems. In particular, the software abstraction layer provides an interface that allows an operating system, such as Windows NT to run concurrently with a UNIX operating system on the same data processing system. Interaction between the Windows NT operating system and the base machine are handled by the UNIX operating system through a translation of requests...and calls from a format normally made by the Windows NT operating system to the base machine into a format that is processed by the UNIX operating system. Request and data intended for the Windows NT operating system are received by the UNIX operating system and translated by the software abstraction layer into a format usable by the Windows NT operating system.

Further, the software abstraction layer may be configured to handle more than one operating system being executed as a task under the UNIX operating system. Although the depicted examples illustrate a UNIX operating system and a Windows NT operating system, the present invention may be applied to other types of operating systems using a software abstraction layer.

It is important to note that while the present invention has been described in the context of a fully functioning data processing system, those of ordinary skill in the art will appreciate that the processes of the present invention are capable of being distributed in a form of a computer readable medium of instructions and a variety of forms and that the present invention applies equally regardless of the particular type of signal bearing media actually used to carry out the distribution. Examples of computer readable media include: recordable-type media such a floppy discs and CD-ROMs and transmission-type media such as digital and analog communications links.

The description of the preferred embodiment of the present invention has been presented for purposes of illustration and description, but is not limited to be exhaustive or limited to the invention in the form disclosed. Many modifications and variations will be apparent to those of ordinary skill in the art. That the embodiment was chosen and described in order to best explain the principles of the invention the practical application to enable others of ordinary skill in the art to understand the invention for various embodiments with various modifications as are suited to the particular use contemplated.

What is claimed is:

1. A method for concurrent execution of a primary operating system and a secondary operating system within a data processing system, the method comprising the computer-implemented steps of:

trapping a hardware interrupt in the primary operating system;

determining that the hardware interrupt is directed to the secondary operating system;

sending an interrupt indication to a software abstraction layer from the primary operating system, wherein the software abstraction layer interfaces the secondary operating system to the primary operating system without emulating hardware and without emulating the secondary operating system; and sending the interrupt indication from the software abstraction layer to the secondary operating system, wherein the secondary operating system executes within the primary operating system.

2. The method of claim 1 further comprising:

receiving the interrupt indication in the secondary operating system;

sending a request, from the secondary operating system to the software abstraction layer, for data from hardware of the data processing system; and sending, from the software abstraction layer to the primary operating system, the request for data from the hardware of the data processing system.

3. The method of claim 2 further comprising:

sending requested data from the primary operating system to the software abstraction layer; and sending the requested data from the software abstraction layer to the secondary operating system.

4. The method of claim 3 further comprising:

sending a request to clear the hardware interrupt from the secondary operating system to the software abstraction layer; and sending the request to clear the hardware interrupt from the software abstraction layer to the primary operating system.

5. The method of claim 1 wherein the primary operating system is a UNIX operating system and wherein the secondary operating system is a Windows NT operating system.

6. The method of claim 2 wherein the request for data from the hardware is generated by a device driver in the secondary operating system.

7. The method of claim 1 wherein the data processing system includes a disk drive and the request for data from the hardware is a read/write request to the disk drive.

8. A method for concurrent execution of a primary operating system and a secondary operating system within a data processing system, the method comprising the computer-implemented steps of:

executing the secondary operating system within the primary operating system, wherein a software abstraction layer interfaces the secondary operating system to the primary operating system without emulating hardware and without emulating the secondary operating system; and executing the primary operating system within the data processing system, wherein the primary operating system interfaces with hardware of the data processing system to trap hardware interrupts directed to the primary operating system and the secondary operating system.

9. The method of claim 8 further comprising:
sending a hardware interrupt indication from the primary operating system to the software abstraction layer, wherein the software abstraction layer passes the hardware interrupt indication through to the secondary operating system.

10. The method of claim 8 further comprising:
sending a data request from the secondary operating system to the software abstraction layer, wherein the software abstraction layer passes the data request through to the primary operating system; and
sending requested data from the primary operating system to the software abstraction layer, wherein the software abstraction layer passes the requested data through to the secondary operating system.

11. A method for concurrent execution of a primary operating system and a secondary operating system within a data processing system, the method comprising the computer-implemented steps of:
executing the secondary operating system within the primary operating system, wherein a software abstraction layer interfaces the secondary operating system to the primary operating system without emulating hardware and without emulating the secondary operating system;
executing the primary operating system within a data processing system, wherein the primary operating system interfaces with hardware of the data processing system;
sending, from the secondary operating system to the software abstraction layer, a request for data from the hardware of the data processing system; and
sending, from the software abstraction layer to the primary operating system, the request for data form the hardware of the data processing system.

12. The method of claim 11 further comprising:
sending requested data from the primary operating system to the software abstraction layer; and
sending the requested data from the software abstraction layer to the secondary operating system.

13. The method of claim 11 wherein the primary operating system is a UNIX operating system.

14. The method of claim 11 wherein the secondary operating system is a Windows NT operating system.

15. The method of claim 11 wherein the request for data from the hardware of the data processing system is generated by a device driver in the secondary operating system.

16. The method of claim 11 wherein the data processing system includes a disk drive and the request for data from the hardware of the data processing system is a read/write request to the disk drive.

17. A data processing system comprising:
a processor;
a secondary operating system within a primary operating system, wherein a software abstraction layer interfaces the secondary operating system to the primary operating system without emulating hardware and without emulating the secondary operating system; and
a primary operating system within the data processing system, wherein the primary operating system interfaces with hardware of the data processing system to trap hardware interrupts directed to the primary operating system and the secondary operating system, the disk drive.

18. The data processing system of claim 17 further comprising:
first sending means for sending a hardware interrupt indication from the primary operating system to the software abstraction layer, wherein the software abstraction layer passes the hardware interrupt indication through to the secondary operating system.

19. The data processing system of claim 17 further comprising:
second sending means for sending a data request from the secondary operating system to the software abstraction layer, wherein the software abstraction layer passes the data request through to the primary operating system; and
third sending means for sending requested data from the primary operating system to the software abstraction layer, wherein the software abstraction layer passes the requested data through to the secondary operating system.

20. A data processing system for concurrent execution of a primary operating system and a secondary operating system, the data processing system comprising:
first executing means for executing the secondary operating system within the primary operating system, wherein a software abstraction layer interfaces the secondary operating system to the primary operating system without emulating hardware and without emulating the secondary operating system;
second executing means for executing the primary operating system within a data processing system, wherein the primary operating system interfaces with hardware of the data processing system;
first sending means for sending, from the secondary operating system to the software abstraction layer, a request for data from the hardware of the data processing system; and
second sending means for sending, from the software abstraction layer to the primary operating system, the request for data form the hardware of the data processing system.

21. The data processing system of claim 20 further comprising:
third sending means for sending requested data from the primary operating system to the software abstraction layer; and
fourth sending means for sending the requested data from the software abstraction layer to the secondary operating system.

22. The data processing system of claim 20 wherein the primary operating system is a UNIX operating system.

23. The data processing system of claim 20 wherein the secondary operating system is a Windows NT operating system.

24. The data processing system of claim 20 wherein the request for data from the hardware of the data processing system is generated by a device driver in the secondary operating system.

25. The data processing system of claim 20 wherein the data processing system includes a disk drive and the request for data from the hardware of the data processing system is a read/write request to the disk drive.

26. A computer program product for use with a data processing system for concurrent execution of a primary operating system and a secondary operating system, the computer program product comprising:

first instructions for executing the secondary operating system within the primary operating system, wherein a software abstraction layer interfaces the secondary operating system to the primary operating system without emulating hardware and without emulating the secondary operating system;

second instructions for execution the primary operating system within a data processing system, wherein the primary operating system interfaces with hardware of the data processing system;

third instructions for sending, from the secondary operating system to the software abstraction layer, a request for data from the hardware of the data processing system; and fourth instructions for sending, form the software abstraction layer to the primary operating system, the request for data form the hardware of the data processing system.

* * * * *